United States Patent
Schmidt (12)

(10) Patent No.: US 6,195,793 B1
(45) Date of Patent: *Feb. 27, 2001

(54) METHOD AND COMPUTER PROGRAM PRODUCT FOR ADAPTIVE INLINING IN A COMPUTER SYSTEM

(75) Inventor: William Jon Schmidt, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,635

(22) Filed: Jul. 22, 1998

(51) Int. Cl.[7] .................................................. G06F 9/45
(52) U.S. Cl. ........................................................ 717/9
(58) Field of Search .................................. 717/9, 5, 7, 8

(56) References Cited

U.S. PATENT DOCUMENTS

| | | | |
|---|---|---|---|
| 5,230,050 | * 7/1993 | Iitsuka et al. ............................ | 717/7 |
| 5,740,443 | * 4/1998 | Carini ...................................... | 717/5 |
| 5,768,595 | * 6/1998 | Gillies ...................................... | 717/9 |
| 5,857,105 | * 1/1999 | Ayers et al. .............................. | 717/9 |
| 5,920,723 | * 7/1999 | Peyton, Jr. et al. ..................... | 717/7 |
| 6,009,273 | * 12/1999 | Ayers et al. .............................. | 717/9 |
| 6,041,179 | * 3/2000 | Bacon et al. ............................. | 717/9 |
| 6,101,326 | * 8/2000 | Mattson, Jr. ............................. | 717/9 |

OTHER PUBLICATIONS

Title: Towards better inlining decisions using inlining, author: Dean J.; Chambers, C, 1994 ACM.*
Title: A compiler for selective procedure inlining, author: Holland, A.; McDaniel, R, ACM, 1993.*
Title: Reducing Indirect Function Call Overhead In C++ Program, author: Calder et al, ACM in 1994.*
Title: Flow–directed Inlining, author: Jagannathan et al, ACM in 1996.*
Title: Optimizing direct threaded code by selective inlining, author: Plumarta et al, ACM 1998.*

* cited by examiner

Primary Examiner—Tariq R. Hafiz
Assistant Examiner—Chameli C. Das
(74) Attorney, Agent, or Firm—Joan Pennington (57) ABSTRACT

A method and computer program product are provided for implementing adaptive inlining in a computer system. Call sites in a call multigraph are identified for possible inlining. A first approximation of initial call sites of the identified possible call sites are identified for inlining. Procedures in the call multigraph are processed in a determined order where a first procedure is only processed after all second procedures called by the first procedure are processed. The processing of the first procedure comprises the steps of determining whether any call site within the first procedure has been selected for inlining, and whether the second procedure called from the call site contains confirmed inlined call sites. If true, it is determined whether to confirm or reject the first approximation to inline the second procedure into the first procedure at the call site utilizing at least one predetermined criterion.

18 Claims, 6 Drawing Sheets

METHOD AND COMPUTER PROGRAM PRODUCT FOR ADAPTIVE INLINING IN A COMPUTER SYSTEM

FIELD OF THE INVENTION

The present invention relates to the data processing field and compiler optimization techniques, and more particularly, relates to a computer implemented method and computer program compiler product for implementing adaptive inlining in a computer system.

DESCRIPTION OF THE RELATED ART

Many languages, particularly object-oriented languages such as Java and C++, encourage a programming style in which procedure calls occur frequently and procedure sizes are small. For such languages, a compiler optimization technique called inlining is extremely important to performance. Although the details can be somewhat complex, the idea is simple. With inlining, a call to a procedure can be replaced by a duplicate of the body of the called procedure. The advantages of inlining are (1) removal of the call overhead required by the procedure calling conventions, and (2) increased optimization opportunities that may arise when the compiler can see the called procedure's instructions in context.

There are disadvantages to inlining as well. One of the most important is the problem of code bloat. If every procedure call in a program was inlined, the program could become extremely large. When this happens, the gains from reduced call overhead and increased optimization can be quickly overwhelmed by the negative caching and paging effects of the enlarged program. Therefore, it is incumbent upon an optimizer to be selective about which procedure calls it chooses to inline.

Most known inliners use the concept of a budget to determine how much code bloat can be tolerated. Inline candidates are ordered on a list according to some heuristic preference, and then candidates from the list are processed until the budget is exhausted. The budget is usually expressed in terms of the amount of expansion that a compile unit is permitted to undergo, although some researchers have suggested using an estimate of compile time as their budget. This is a minority viewpoint.

Determining the best set of call sites to inline within the constraints of a code bloat budget is known to be difficult to solve. Any approach for selecting which sites to inline is necessarily heuristic. There are two techniques described in the literature for selecting which sites to inline. Both techniques require that a call graph be built first, in which each node represents a procedure, and an arc represents a call from the originating node's procedure to the target node's procedure.

The first technique processes the call graph bottom up from the leaves, inlining any procedure that matches some criterion, such as, small size, frequency of execution, and the like, that makes the procedure a good candidate. This is done until the code bloat budget is exhausted. One problem with this technique is that there may be better inline candidates or arcs further up the tree, and the budget may be exhausted before these arcs are reached.

The second technique tries to solve this problem by ordering the arcs in the call graph according to decreasing order of frequency, then selecting the corresponding procedure calls for inlining from the beginning of the list, until the budget is used up. This also has a problem, in that the code bloat estimates may be very inaccurate, and hence the budget may be heavily overspent.

For example, consider a set of procedures in which A calls B, and B calls C, D, E, and F. Each procedure originally consists of 100 instructions. Suppose that our code bloat budget is 500 instructions. Looking at each of these five procedure calls in isolation, the optimizer will estimate the code bloat for each as 100 instructions, and choose to inline all of these calls. Once C, D, E, and F are inlined into B, however, B's size has swollen to 500 instructions, rather than 100. Assuming that B, C, D, E, and F are all called from other procedures and therefore cannot be eliminated, we have increased the program's size by 900 instructions, rather than 500.

A need exists for an effective inlining technique in a computer system, capable of selecting important inline candidates without excessive code bloat.

SUMMARY OF THE INVENTION

A principal object of the present invention is to provide a method and computer program product for implementing adaptive inlining in a computer system. Other important objects of the present invention are to provide such method and computer program product for implementing adaptive inlining substantially without negative effect and that overcome some of the disadvantages of prior art arrangements.

In brief, a method and computer program product are provided for implementing adaptive inlining in a computer system. Call sites in a call multigraph are identified for possible inlining. A first approximation of initial call sites of the identified possible call sites are identified for inlining. Procedures in the call multigraph are processed in a determined order where a first procedure is only processed after all second procedures called by the first procedure are processed. The processing of the first procedure comprises the steps of determining whether any call site within the first procedure has been selected for inlining, and whether the second procedure called from the call site contains confirmed inlined call sites. If true, it is determined whether to confirm or reject the first approximation to inline the second procedure into the first procedure at the call site utilizing at least one predetermined criterion.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
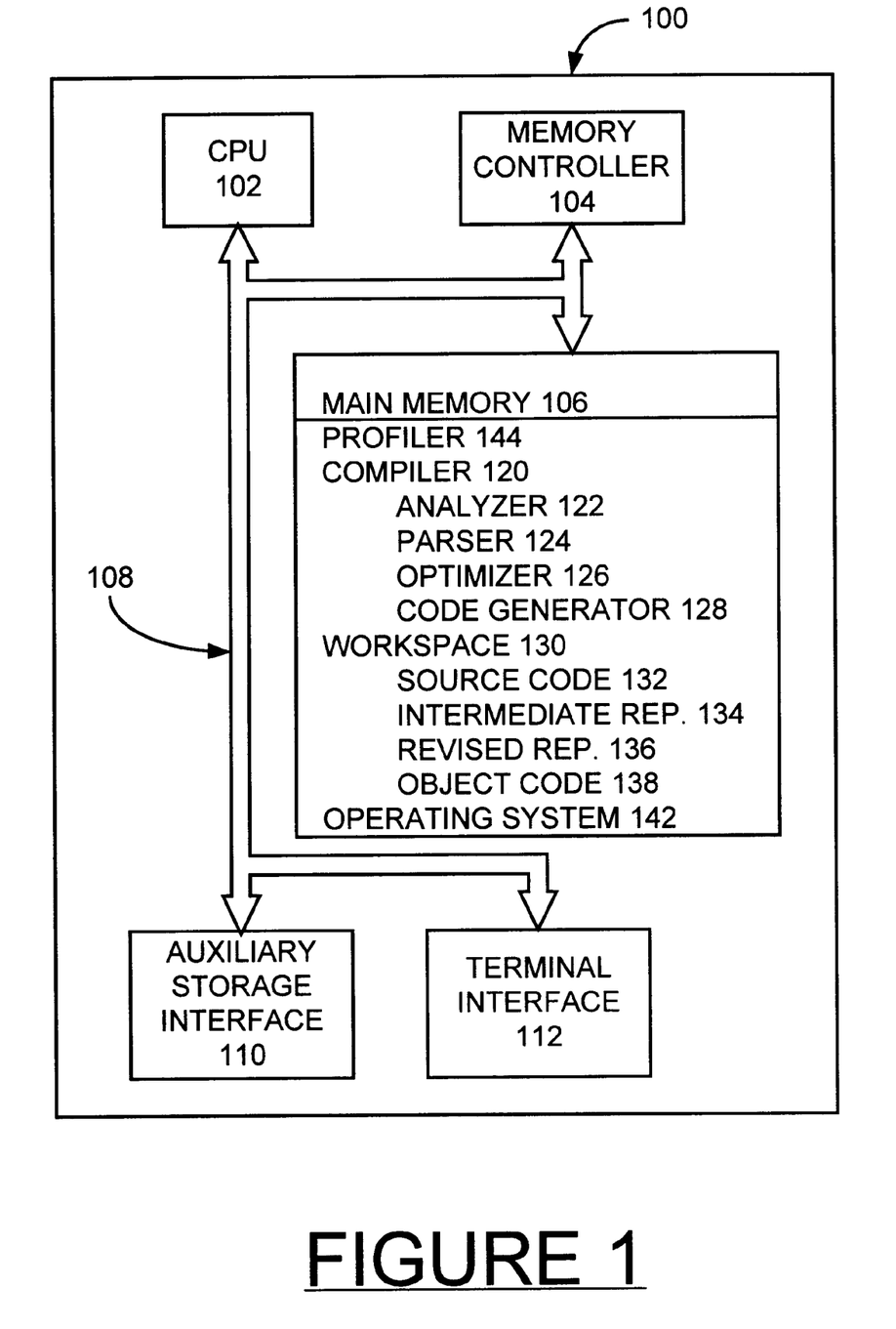
FIG. 1 is a block diagram representation illustrating a computer system for implementing compiler optimization methods and a computer program product for implementing adaptive inlining in a computer system in accordance with a preferred embodiment of the present invention.

Having reference now to the drawings, in FIG. 1, there is shown a computer or data processing system of the preferred embodiment generally designated by the reference character 100. As shown in FIG. 1, computer system 100 includes a central processor unit (CPU) 102, a memory controller 104 coupled to a main memory 106 via a system bus 108. CPU 102, memory controller 104 and main memory 106 are connected to an auxiliary storage interface 110 and a terminal interface 112 via the system bus 108.

As shown in FIG. 1, computer system 100 includes a compiler 120 residing within the main memory 106. Compiler 120 comprises an analyzer 122, a parser 124, an optimizer 126 and a code generator 128. Computer system 100 includes a workspace 130 for storing a source code representation 132, an intermediate representation 134, a revised representation 136 and an object code representation 138. The analyzer 122 analyzes the program, performing syntactic and semantic analysis to check the source program input for errors and to determine its meaning. The parser 124 typically uses a context-free grammar to determine if program statements satisfy a set of grammar rules and builds constructs. The parser 124 then generates the intermediate representation 134. The optimizer 126 operates on the intermediate representation 134 to generate the optimized or revised representation 136. The code generator 128 converts the revised representation 136 into object code 138 or the actual program that a computer can execute. Computer system 100 includes an operating system 142 supporting the compiler 120 and an optional profiler 144 for generating profile data about a program's runtime behavior. It should be understood that features of the preferred embodiment apply to various types of compilers 120 and profilers 144. Compiler 120 may reside within memory 106 of computer 100 or may reside on a separate computer system. Profiler 144 can be included within compiler 120 or may be a separate computer program providing profile data utilized by the compiler 120.

Various commercially available processors could be used for computer system 100, for example, an IBM personal computer or similar workstation can be used. Central processor unit 102 is suitably programmed to execute the flowchart of FIGS. 2, 3, 4 and 5 of the preferred embodiment.

In accordance with features of the preferred embodiment, an adaptive approach is taken for selecting inline candidates. A more global view of inlining effects is provided in order to select good inlining candidates while accurately spending the code bloat budget. First the best call sites at which to inline are estimated, based upon the execution frequencies of the call sites and the sizes of the called procedures. Then the call graph is processed starting from the leaves and working up. Each time an arc that was selected for inlining is encountered, the original bloat estimate is compared with the current size of the procedure, for example, incorporating sizes of any procedures that were inlined into the procedure. If the called procedure has been bloated beyond an acceptable limitation, it may be rejected for inlining. If this were the whole algorithm, it could result in massive underspending of the code bloat budget or the opposite of the problem we are trying to solve. To avoid this, a sorted list of alternative inlining candidates is maintained as the call graph is processed. Whenever an inline candidate is rejected because of excessive bloat, the best alternative inline candidate is selected and inlined instead, provided that the program size increase entailed will not be much greater than the original code bloat estimated for the rejected procedure. Using this method, the final code bloat is close to the original code bloat budget with an effective set of procedures selected for inlining.

Figure 2:
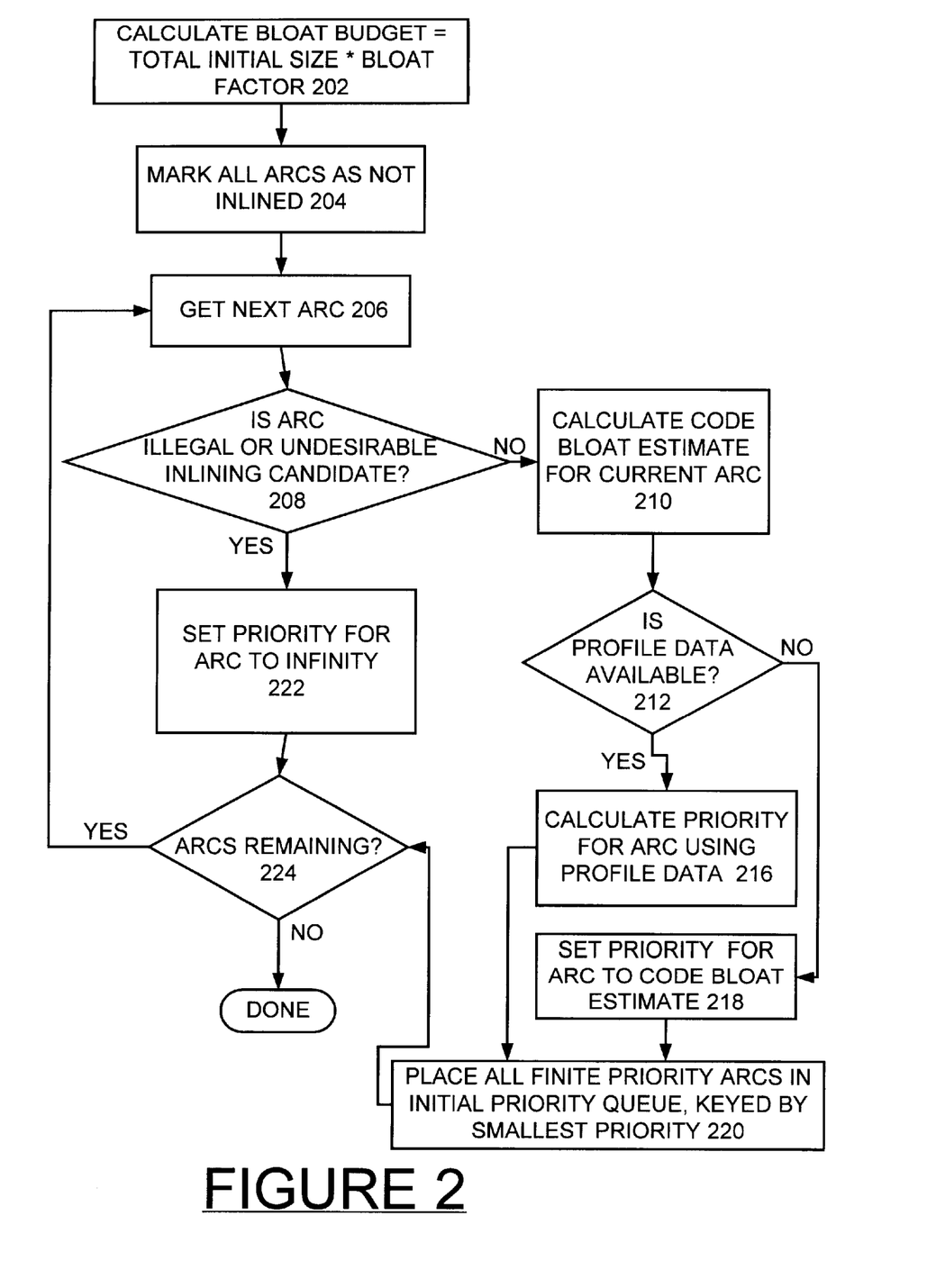
FIGS. 2, 3, 4 and 5 are flow diagrams illustrating methods for implementing adaptive inlining in a computer system in accordance with a preferred embodiment of the present invention.
Figure 3:
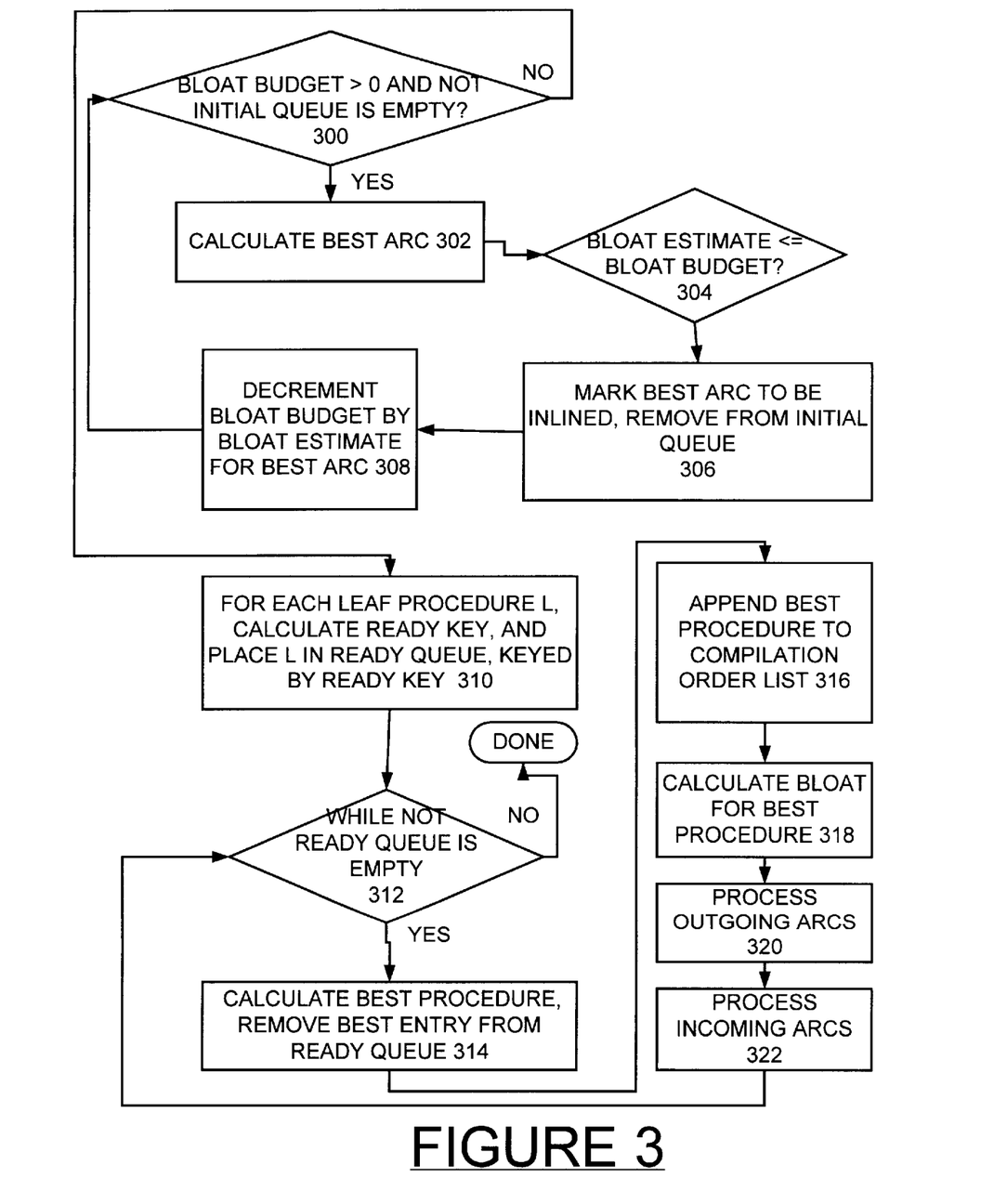

Referring to FIGS. 2 and 3, and the following TABLE 1 a method for selection of inline candidates of the preferred embodiment is shown. While many variations on the basic algorithm presented in TABLE 1 are possible; the fundamental concept of the inline candidate selection method is to select an initial set of inline candidates and adaptively modify the initial set of inline candidates as more information becomes available. A multigraph is generated for the program or module being compiled. Each node in the multigraph represents a procedure in the module, and each arc from a first node to a second node represents a call site in the first procedure that may invoke the second procedure. For example, each arc AB represents a call site in procedure A that may invoke procedure B. In the multigraph, there potentially may be two arcs from A to B, if A calls B at two distinct locations or call sites. As used in the description and claims, an outgoing arc represents an outgoing call from a current procedure or node in a multigraph for the program or module being compiled to another procedure. An incoming arc represents an incoming call to a current procedure or node in a multigraph for the program or module being compiled from another procedure.

The algorithm presented in TABLE 1 is designed to balance the two considerations of selecting the most desirable call sites for inlining and making accurate estimates of code bloat.

The inputs to the adaptive inlining algorithm of the preferred embodiment are defined as follows. (1) A call multigraph, consisting of N nodes and E edges, where each node represents a procedure in the module, and each arc AB represents a call site in procedure A that may invoke procedure B. (2) An array initialSize[1, . . . , N] containing the estimated instruction counts for each procedure. (3) An optional array arcWeight[1, . . . , E] containing the profiled arc weights.

The outputs of the adaptive inlining algorithm of the preferred embodiment are defined as follows. (1) A permutation of the N procedures in the module, indicating the order in which the procedures will be compiled. (2) A Boolean array inline {1, . . . , E} such that inline[AB]=True if B should be inlined at the corresponding call site within A.

TABLE 1

ALGORITHM FOR SELECTION OF INLINE CANDIDATES:

```
totalInitialSize:=sum_f{initialSize[f]};
bloatBudget:=totalInitialSize * BloatFactor; //tunable
constant
for i:=1 to E do
    inline[i]:=False;
    if the ith arc is an illegal or undesirable
    inlining candidate then
        priority[i]:=∞;
    else
        bloatEstimate[i]:=initialSize[head(i)];
        if profile data is available then
            priority[i]:=bloatEstimate[i]/
            (arcWeight[i] + 1);
        else
            priority[i]:=bloatEstimate[i];
        end if;
    end if;
end for;
Place all arcs with finite priority in InitialQueue
priority queue, keyed by smallest priority;
while bloatBudget>0 and not InitialQueue.isEmpty() do
    bestArc:=InitialQueue.removeBestEntry();
    if bloatEstimate[bestArc]<=bloatBudget then
        inline[bestArc]:=True;
        Decrement bloatBudget by
        bloatEstimate[bestArc];
```

TABLE 1-continued

ALGORITHM FOR SELECTION OF INLINE CANDIDATES:

```
        end if;
    end while;
    for each leaf procedure L do
        readyKey[L]:=smallest priority[i] such that i is
        incident to L;
        Place L in ReadyQueue, keyed by readyKey;
    end for;
    while not ReadyQueue.isEmpty() do
        bestProc:=ReadyQueue.removeBestEntry();
        Append bestProc to the compilation order list;
        bloat[bestProc]:=initialsize[bestProc];
        ProcessOutgoingArcs();
        ProcessIncomingArcs();
    end while;
```

In FIGS. 2 and 3, sequential steps of the TABLE 1 algorithm for initialization, first approximation of inline candidates, and refinement of the first approximation of inline candidates are shown. The amount of code bloat that appropriately can incur is calculated by adding the total estimated instruction stream sizes for all procedures and multiplying by a tunable percentage factor, bloat factor as indicated at a block 202. All arcs are initially marked as not inlined as indicated at a block 204. Each arc in the call multigraph is considered and an arc is obtained as indicated at a block 206. Checking whether the arc is illegal or an undesirable inlining candidate is performed as indicated at a decision block 208. For each arc that is legal and possibly profitable to inline, an initial estimate of the amount of code bloat that would be incurred from inlining it is calculated as indicated at a block 210. Checking for available profile data is performed as indicated at a decision block 212. As indicated at a block 216, a priority is assigned for each arc that is legal and possibly profitable to inline utilizing the profile data where, for example, the priority is calculated by dividing the calculated code bloat estimate (high is bad) by its execution frequency (high is good). In the absence of profile data, the execution frequency will be arbitrarily set to 1 so that the priority equals the code bloat estimate as indicated at a block 218. The smaller the priority value, the better the inline candidate, with zero or negative priorities being possible. All inline candidates or arcs with non-infinite priority are placed in an initial priority queue keyed by the priority just calculated.

Any arc that is not a legal or desirable inlining opportunity is given a priority of positive infinity so that it is never inlined as indicated at a block 218. Such arcs include calls to procedures taking a variable-length argument list, calls with parameter mismatches, calls from recursive routines to nonrecursive routines having large stack requirements, indirect call site arcs, Java method call arcs that will not become bound calls, arcs whose execution frequencies do not exceed a minimum threshold, and call sites located in basic blocks executed much less frequently than the prologue block in the same procedure. In the last two cases, inlining is unlikely to be profitable, in the other cases, it is illegal.

In the first approximation phase of FIG. 2, all inline candidates or arcs with finite priority are placed in the initial priority queue. Then as indicated at a block 306, the best inline candidates are removed from the initial priority queue, marking them as tentatively to be inlined, until the code bloat budget has been exhausted. This initial queue is then discarded. At this point the best sites to be inlined have been determined, provided that none of the inlined procedures grow because they themselves contain inlined call sites.

In the refinement stage, the compilation order for procedures is determined and the determination of which procedures to inline possibly is changed, based on changes in procedure size. Two more priority queues are used to accomplish this. A ReadyQueue contains all procedures that can be issued next in the compilation order, either because they are leaf procedures or because all of their children have already been placed in the compilation order. The procedures in the ReadyQueue are sorted based on the inlining priority of the best incoming arc for each procedure. That is, given that either of two procedures could be issued at a given time, the one we choose should be the one that has the highest inlining value, because it is called from a high priority call site. The intent of this is not only to process important call sites as soon as possible, but also to populate the AuxQueue with high priority call sites that did not make the initial cut of inline candidates. The AuxQueue contains initially outlined call sites whose final bloat is known, and that may be used to replace those candidates that have bloated unacceptably since they were initially selected.

All leaf procedures are placed in the ready queue as indicated at a block 310. Then the best procedure is repeatedly selected from the ready queue and processed as indicated at blocks 312 and 314. First the best procedure is appended to the compilation order list as indicated at a block 316. The bloat of the best procedure is calculated as indicated at a block 318. Any subsequent inlining of call sites within the procedure itself will cause its bloat to increase. Then all outgoing arcs are processed as indicated at a block 320 to confirm or reject the initial inlining decisions made about the outgoing arcs, and all incoming arcs as indicated at a block 322 to determine which arcs should be placed in the AuxQueue and which procedures should be placed in the ReadyQueue.

Figure 4:
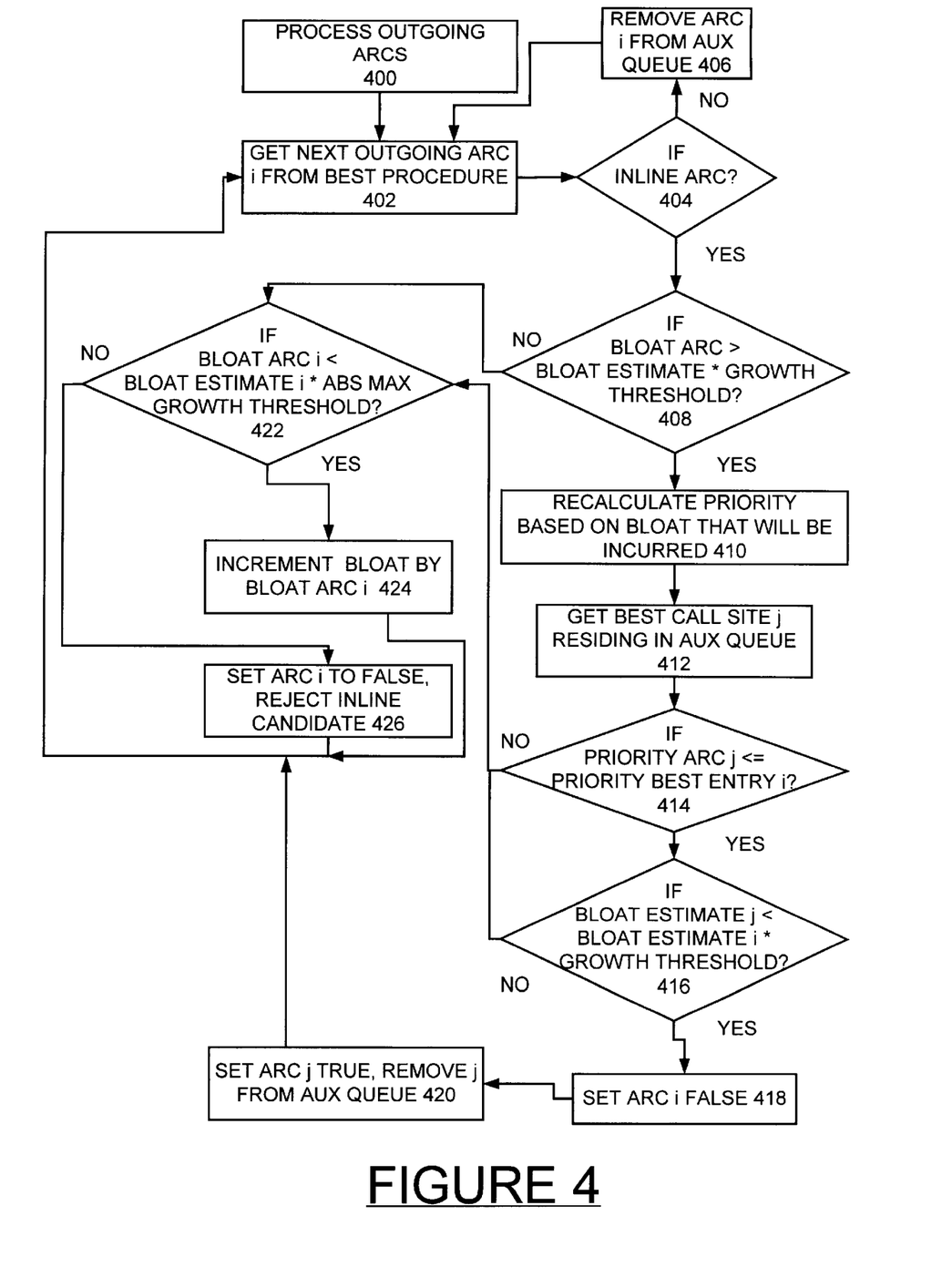

Referring to the following TABLE 2 and FIG. 4 processing of all outgoing arcs is illustrated.

For each arc leaving the currently selected procedure, checking whether the outgoing arc was previously selected as an inline candidate is performed as indicated at a decision block 404. If not, there is nothing to be done, other than to remove it from AuxQueue if present as indicated at a block 406. (After adding a procedure to the compilation order, any of its children that have not already been selected for inlining are no longer allowed to be inlined into the procedure.) If the outgoing arc was selected as an inline candidate, checking to see whether the target procedure has grown in size since that decision was made is performed as indicated at a decision block 408, and if so by how much. A tunable parameter, GrowthThreshold utilized at decision block 408 determines how much growth is permissible before an alternate inlining candidate should be sought.

TABLE 2

OUTGOING ARCS PROCESSING FOR A SELECTED PROCEDURE

```
ProcessOutgoingArcs:
    for each outgoing arc i from bestProc do
        if inline[i]then
            if bloat[head(i)]>bloatEstimate[i]
                *GrowthThreshold then
            priority[i]:=arcWeight[i] /
            bloat[head(i)];
            j:=AuxQueue.peekBestEntry();
            if priority[j]<=priority[i] then
                if bloatEstimate[j]<
                    bloatEstimate[i] *
                    GrowthThreshold then
```

TABLE 2-continued

OUTGOING ARCS PROCESSING FOR A SELECTED PROCEDURE

```
            inline[i]:=False;
            inline[j]:=True;
            Remove j from AuxQueue;
        else if bloat[head(i)]<
            bloatEstimate[i] *
            AbsMaxGrowth then
            Increment bloat[bestProc]
            by bloat[head(i)];
        else
            inline[i]:=False;
        end if;
    else if bloat[head(i)]<
        bloatEstimate[i] * AbsMaxGrowth
        then
            Increment bloat[bestProc]by
                bloat[head(i)];
        else
            inline[i]:=False;
        end if;
    else if bloat[head(i)] < bloatEstimate[i] *
            AbsMaxGrowth then
            Increment bloat[bestProc] by
                bloat[head(i)];
        else
            inline[i]:=False;
        end if;
    else
        Remove i from AuxQueue;
    end if;
end for;
```

If the call site exceeds the allowable growth at decision block 408, its priority is recalculated based on the bloat now known that will be incurred as indicated at a block 410. A best call site j residing in the AuxQueue is obtained as indicated at a block 412. Then checking to see whether the best call site j residing in the AuxQueue obtained at block 412 has a priority at least as great as the one being considering is performed as indicated at a decision block 414. If the priority of the best call site j is less than or equal to the calculated priority at block 412, then checking is performed to determine whether the alternate best call site j from the AuxQueue should be inlined instead as indicated at a decision block 416. If the bloat from the alternate call site would also exceed what would have been acceptable for the original call site, the alternate call site from the AuxQueue should not be inlined either at this time. Otherwise, when determined that the bloat estimate for the alternate call site j from the AuxQueue is less than the bloat estimate i multiplied by the growth threshold at decision block 416, then the original candidate i is set to false as indicated at a block 418. The alternate call site is marked as inlinable and then removed from the AuxQueue as indicated at a block 420. If the priority of the best call site j is less than or equal to the calculated priority at block 412, then checking whether the bloat of the original candidate i is less than its bloat estimate multiplied by an absolute maximum growth value is performed as indicated at a decision block 422. If the bloat of the original candidate i is less than its bloat estimate multiplied by an absolute maximum growth value at decision block 422, the original candidate is still marked to be inlined and the bloat of the target procedure is added to the bloat for its parent procedure as indicated at a block 424. Otherwise the original candidate is marked not to be inlined as indicated at a block 426. Then the sequential operations return to block 402.

Figure 5:
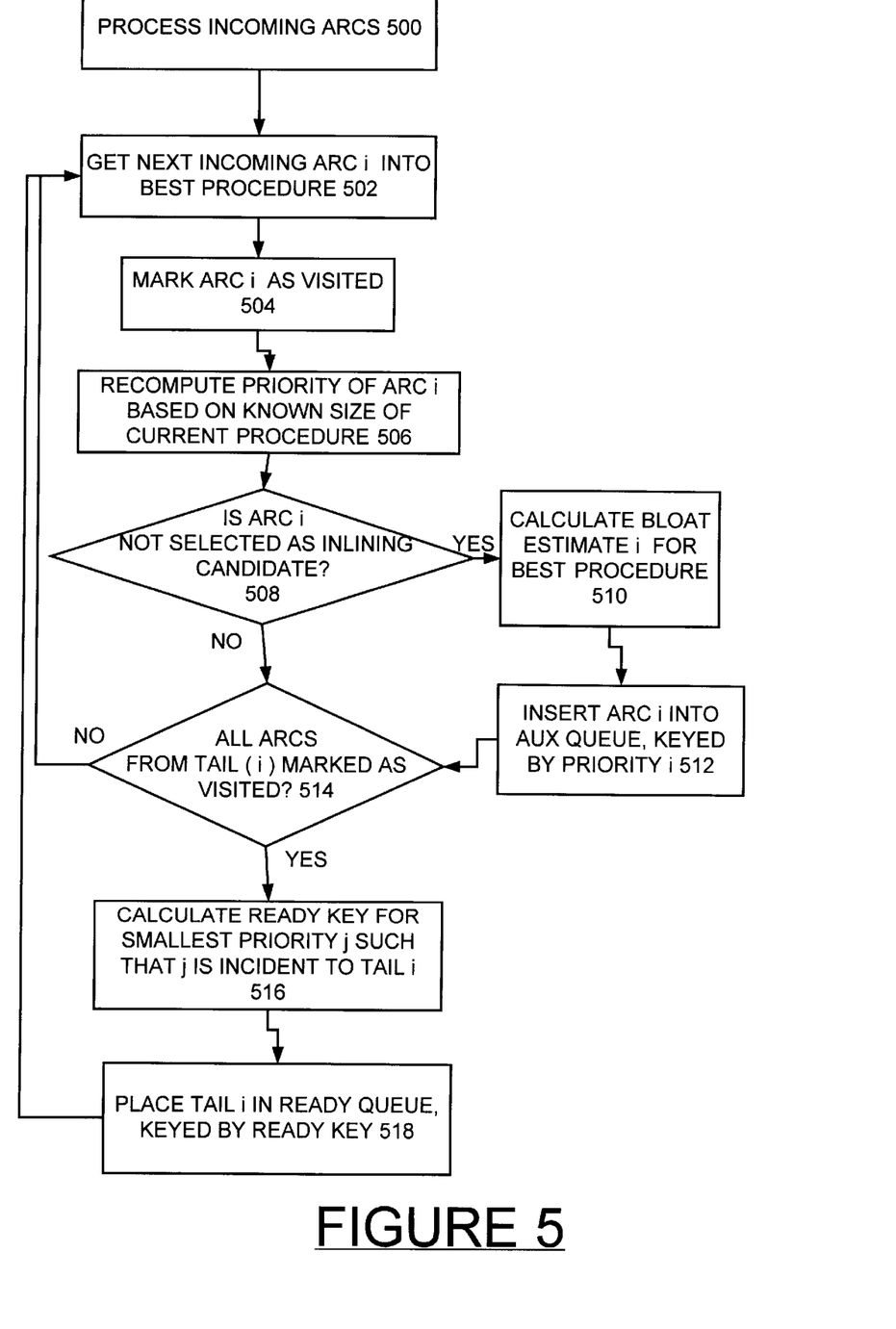

Referring to the following TABLE 3 and FIG. 5 processing of all incoming arcs is illustrated. Now that the final size of the current procedure has been determined, the arcs connecting it with its parents are updated. Each such arc is marked as visited as indicated at a block 504, and the priority of the arc is recomputed based on the known size of the current procedure as indicated at a block 506. If the arc was not originally selected as an inline candidate identified at a decision block 508, then the arc is inserted into the AuxQueue to get a second chance for inlining. Any parent of the current procedure that now has all of its outgoing arcs marked as visited is free to enter the ReadyQueue as indicated at blocks 516, 518.

TABLE 3

INCOMING ARCS PROCESSING FOR A SELECTED PROCEDURE

```
ProcessIncomingArcs:
for each incoming arc I into bestProc do
    Mark i as visited;
    priority[i]:=bloat[bestProc] / (arcWeight[i] + 1);
    if not inline[i] then
        bloatEstimate[i]: =bloat[bestProc];
        Insert i into AuxQueue, keyed by priority[i];
    end if;
    if all outgoing arcs from tail(i) are marked
            visited then
        readyKey[tail(i)]:=smallest priority[j] such
            that j is incident to tail(i);
        Place tail(i) in ReadyQueue, keyed by
            readyKey[tail(i)];
    end if;
end for;
```

Procedures that are not exported and that do not have their addresses taken do not have to be translated separately if they are inlined into all of their callers. The bloat estimate for inlining such a procedure is too large if the procedure is successfully inlined at all sites. As an obvious example, a procedure called from only one call site produces no bloat if it is inlined and eliminated. To recognize this, the bloat estimates for such a procedure should be multiplied by $(n-1)/n$, where n is the number of incoming arcs to the procedure's call graph node.

Figure 6:
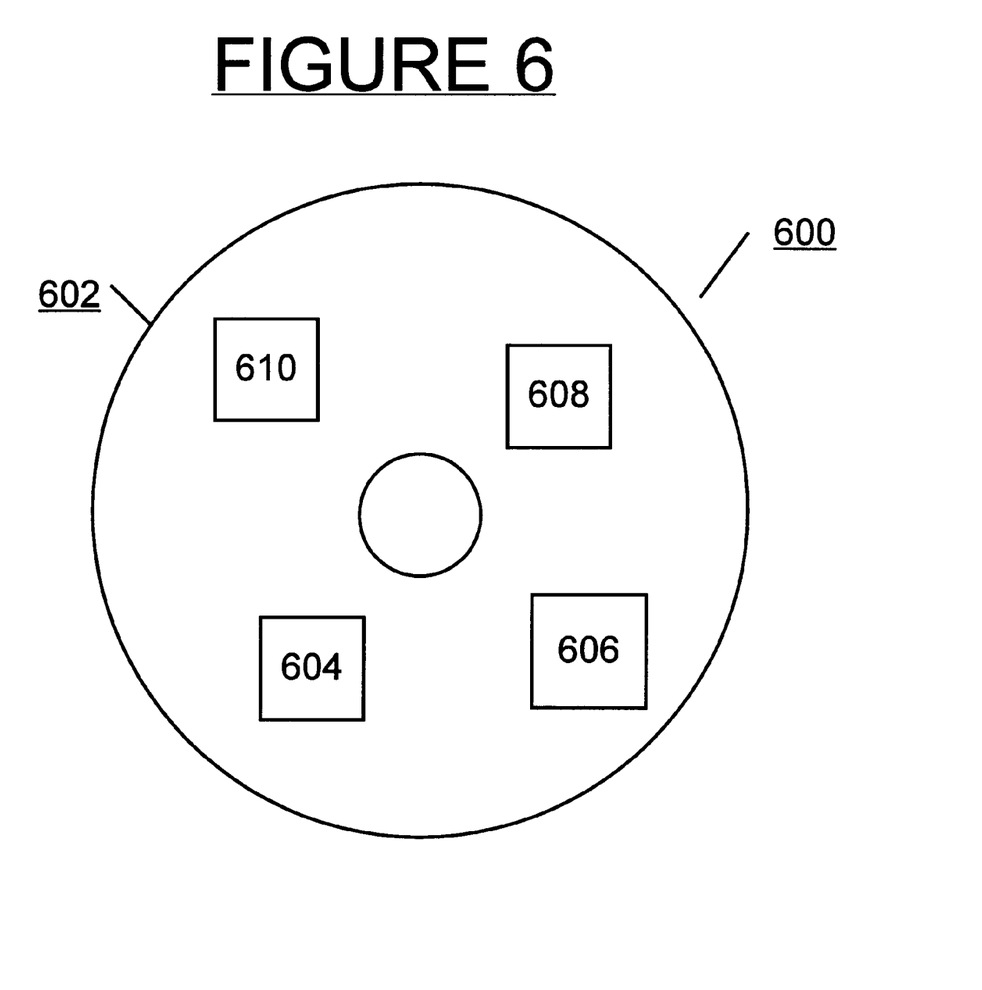
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 606, 604, 608, 610 on the medium 602 for carrying out the methods for implementing adaptive inlining of the preferred embodiment in the system 100 of FIG. 1.

A sequence of program instructions or a logical assembly of one or more interrelated modules defined by the recorded program means 606, 604, 608, 610, direct the computer system 100 for implementing adaptive inlining of the preferred embodiment.

While the present invention has been described with reference to the details of the embodiments of the invention shown in the drawing, these details are not intended to limit the scope of the invention as claimed in the appended claims.

What is claimed is:

1. A computer implemented compiler method for implementing adaptive inlining for compiler optimization and improving program execution in a computer system comprising the steps of:

identifying call sites in a call multigraph for possible inlining;

identifying a first approximation of initial call sites of said identified possible call sites for inlining based upon call frequency and called procedure size including the steps of; utilizing a call multigraph consisting of N nodes and E edges; where each node represents a procedure in the module, and each arc AB represents a call site in a procedure A that may invoke a procedure B; an array initialSize containing estimated instruction counts for each procedure 1–N;

calculating a total initial sum of the array initialSize;

calculating a bloat budget equal to said total initial sum multiplied by a set bloat factor; and for each arc 1 to E, checking for an illegal or undesirable inlining candidate, responsive to identifying an illegal or undesirable inlining candidate, setting a priority for the arc to infinity, responsive to not identifying an illegal or undesirable inlining candidate, calculating a bloat estimate and a priority for the arc, and all finite priority arcs being placed in said initial priority queue, keyed by smallest priority;

processing procedures in said call multigraph in a determined order where a first procedure is only processed after all second procedures called by said first procedure are processed; said processing of said first procedure comprising the steps of:

determining whether any call site within said first procedure has been selected for inlining, and whether the second procedure called from the call site contains confirmed inlined call sites; and if true, determining whether to confirm or reject the first approximation to inline the second procedure into said first procedure at the call site utilizing at least one predetermined criterion.

2. A computer implemented method for implementing adaptive inlining for compiler optimization as recited in claim 1 wherein the step of determining whether to confirm or reject the first approximation to inline the second procedure into said first procedure at the call site utilizing at least one predetermined criterion includes the steps of comparing a first threshold value based on an original estimated size of the second procedure with an estimated size of the second procedure after inlining; and responsive to the estimated size of the second procedure after inlining exceeding the first threshold value, rejecting the first approximation to inline the second procedure into said first procedure at the call site.

3. A computer implemented method for implementing adaptive inlining for compiler optimization as recited in claim 2 includes the step responsive to the estimated size of the second procedure after inlining not exceeding the first threshold value, confirming the first approximation to inline the second procedure into said first procedure at the call site.

4. A computer implemented method for implementing adaptive inlining for compiler optimization as recited in claim 1 wherein the step of calculating a priority for the arc includes the steps of:

checking for available profile data;

responsive to identifying available profile data, calculating said priority utilizing an arc weighting factor based upon call frequency divided into said calculated bloat estimate; and responsive to not identifying available profile data, setting said priority equal to said calculated bloat estimate.

5. A computer implemented method for implementing adaptive inlining for compiler optimization as recited in claim 1 wherein the step of determining whether to confirm or reject the first approximation to inline the second procedure into said first procedure at the call site utilizing at least one predetermined criterion includes the steps of:

for each outgoing arc marked for inlining, checking whether the outgoing arc call site exceeds an allowable growth threshold, when the outgoing arc call site exceeds an allowable growth threshold, calculating a priority for the outgoing arc call site and comparing said calculated priority with a priority of an alternate best call site residing in an auxiliary priority queue.

6. A computer implemented method for implementing adaptive inlining for compiler optimization as recited in claim 5 includes the steps of:

when the priority of said alternate best call site is less than or equal to said calculated priority, checking whether said alternate best call site exceeds an allowable growth threshold, when said alternate best call site does not exceed said allowable growth threshold, rejecting the outgoing arc call site exceeding said allowable growth threshold, and selecting said alternate best call site for inlining, removing said alternate best call site from said auxiliary priority queue.

7. A computer implemented method for implementing adaptive inlining for compiler optimization as recited in claim 5 includes the steps of:

when the priority of said alternate best call site is greater than said calculated priority, checking whether the outgoing arc call site exceeds an absolute maximum growth threshold, when the outgoing arc call site exceeds said absolute maximum growth threshold, rejecting the outgoing arc call site exceeding said absolute maximum growth threshold and rejecting said alternate best call site for inlining.

8. A computer implemented method for implementing adaptive inlining for compiler optimization as recited in claim 7 includes the step of:

when the outgoing arc call site does not exceed said absolute maximum growth threshold, incrementing bloat calculation by the bloat of the outgoing arc call site, and confirming the outgoing arc call site for inlining.

9. A computer implemented method for implementing adaptive inlining for compiler optimization as recited in claim 1 wherein the step of determining whether to confirm or reject the first approximation to inline the second procedure into said first procedure at the call site utilizing at least one predetermined criterion includes the steps of:

utilizing a ready priority queue and an auxiliary priority queue for placement of all incoming arcs into the call site, and for each incoming arc into the call site, marking each incoming arc as visited;

calculating priority of the incoming arc based upon known size of current best procedure;

when the incoming arc is not selected for inlining, calculating a bloat estimate for bloat of current best procedure and inserting the incoming arc into said auxiliary priority queue.

10. A computer implemented method for implementing adaptive inlining for compiler optimization as recited in claim 9 includes the steps of:

when the incoming arc is selected for inlining and all outgoing arcs from current best procedure are marked as visited, insert the incoming arc into said ready queue.

11. A computer program compiler product for implementing adaptive inlining for compiler optimization and improving program execution in a computer system comprising:
  a recording medium;
  means, recorded on the recording medium, for identifying call sites in a call multigraph for possible inlining;
  means, recorded on the recording medium, for identifying a first approximation of first priority call sites of said identified possible call sites for inlining based upon call frequency and called procedure size including means, recorded on the recording medium, for utilizing said call multigraph consisting of N nodes and E edges; where each node represents a procedure in the module, and each arc AB represents a call site in a procedure A that may invoke a procedure B; an array initialSize containing estimated instruction counts for each procedure 1–N;
    means, recorded on the recording medium, for calculating a total initial sum of the array initialSize;
    means, recorded on the recording medium, for calculating a bloat budget equal to said total initial sum multiplied by a set bloat factor; and
    means, recorded on the recording medium, for each arc 1 to E,
    means, recorded on the recording medium, for checking for an illegal or undesirable inlining candidate,
    means, recorded on the recording medium, responsive to identifying an illegal or undesirable inlining candidate, for setting a priority for the arc to infinity,
    means, recorded on the recording medium, responsive to not identifying an illegal or undesirable inlining candidate, for calculating a bloat estimate and a priority for the arc, and
    means, recorded on the recording medium, for placing all finite priority arcs in an initial priority queue, keyed by smallest priority;
  means, recorded on the recording medium, for calculating and for removing best priority call sites arcs from said initial priority queue;
  means, recorded on the recording medium, for marking said best priority call sites removed from said priority queue for possible inlining;
  means, recorded on the recording medium, for determining a compilation order and for processing said marked best procedure call sites using a ready priority queue and an auxiliary priority queue;
  means, recorded on the recording medium, for processing all outgoing arcs from said best procedure call sites in said ready priority queue to confirm or reject inlining; and
  means, recorded on the recording medium, for processing all incoming arcs for placement in either said ready priority queue or said auxiliary priority queue.

12. A computer program product for implementing adaptive inlining for compiler optimization as recited in claim 11 wherein said means, recorded on the recording medium, for processing all outgoing arcs from said best procedure call sites in said ready priority queue to confirm or reject inlining include means, recorded on the recording medium, for checking whether the outgoing arc call site exceeds an allowable growth threshold; means, recorded on the recording medium responsive to the outgoing arc call site exceeding said allowable growth threshold, for calculating a priority for the outgoing arc call site and for comparing said calculated priority with a priority of an alternate best call site residing in said auxiliary priority queue.

13. A computer program product for implementing adaptive inlining for compiler optimization as recited in claim 11 includes means, recorded on the recording medium responsive to the priority of said alternate best call site being less than or equal to said calculated priority, for checking whether said alternate best call site exceeds an allowable growth threshold,
  means, recorded on the recording medium responsive to said alternate best call site not exceeding said allowable growth threshold, for rejecting the outgoing arc call site exceeding said allowable growth threshold, for selecting said alternate best call site for inlining, and for removing said alternate best call site from said auxiliary priority queue.

14. A computer program product for implementing adaptive inlining for compiler optimization as recited in claim 13 includes means, recorded on the recording medium responsive to the priority of said alternate best call site being greater than said calculated priority, for checking whether the outgoing arc call site exceeds an absolute maximum growth threshold,
  means, recorded on the recording medium responsive to the outgoing arc exceeding said absolute maximum growth threshold, for rejecting the outgoing arc call site exceeding said absolute maximum growth threshold and for rejecting said alternate best call site for inlining; and
  means, recorded on the recording medium responsive to the outgoing arc not exceeding said absolute maximum growth threshold, for incrementing a bloat calculation by a bloat of the outgoing arc, and for confirming the outgoing arc call site for inlining.

15. A computer program product for implementing adaptive inlining for compiler optimization as recited in claim 11 wherein said means, recorded on the recording medium, for processing all incoming arcs for placement in either said ready priority queue or said auxiliary priority queue include means, recorded on the recording medium, for marking each incoming arc as visited;
  means, recorded on the recording medium, for calculating a priority of the incoming arc based upon known size of current best procedure;
  means, recorded on the recording medium, responsive to the incoming arc not being selected for inlining, for calculating a bloat estimate for bloat of current best procedure and inserting the incoming arc into said auxiliary priority queue.

16. A computer program product for implementing adaptive inlining for compiler optimization and improving program execution in a computer system, said computer program product including a plurality of computer executable instructions stored on a computer readable medium, wherein said instructions, when executed by said computer, cause the computer to perform the steps of:
  identifying call sites in a call multigraph for possible inlining;
  identifying a first approximation of initial call sites of said identified possible call sites for inlining based upon call frequency and called procedure size including the steps of; utilizing a call multigraph consisting of N nodes and E edges; where each node represents a procedure in the module, and each arc AB represents a call site in a procedure A that may invoke a procedure B; an array initialSize containing estimated instruction counts for each procedure 1–N;
  calculating a total initial sum of the array initialSize;

calculating a bloat budget equal to said total initial sum multiplied by a set bloat factor; and for each arc 1 to E,
  checking for an illegal or undesirable inlining candidate,
  responsive to identifying an illegal or undesirable inlining candidate, setting a priority for the arc to infinity,
  responsive to not identifying an illegal or undesirable inlining candidate, calculating a bloat estimate and a priority for the arc, and
  placing all finite priority arcs in an initial priority queue, keyed by smallest priority;

processing procedures in said call multigraph in a determined order where a first procedure is only processed after all second procedures called by said first procedure are processed; said processing of said first procedure comprising the steps of:
  determining whether any call site within said first procedure has been selected for inlining, and whether the second procedure called from the call site contains confirmed inlined call sites; and
  if true, determining whether to confirm or reject the first approximation to inline the second procedure into said first procedure at the call site utilizing at least one predetermined criterion.

17. A computer program product for implementing adaptive inlining for compiler optimization as recited in claim 16 wherein the step of determining whether to confirm or reject the first approximation to inline the second procedure into said first procedure at the call site utilizing at least one predetermined criterion includes the steps of comparing a first threshold value based on an original estimated size of the second procedure with an estimated size of the second procedure after inlining; and responsive to the estimated size of the second procedure after inlining exceeding the first threshold value, rejecting the first approximation to inline the second procedure into said first procedure at the call site.

18. A computer program product for implementing adaptive inlining for compiler optimization as recited in claim 17 includes the step responsive to the estimated size of the second procedure after inlining not exceeding the first threshold value, confirming the first approximation to inline the second procedure into said first procedure at the call site.

* * * * *